April 1, 1958 H. LINDEMANN 2,829,117
PROCESS FOR MAKING CLOSED CELL CELLULAR BODIES
Filed July 27, 1953 5 Sheets-Sheet 1

INVENTOR
Herbert Lindemann
BY
Michael S. Striker
ATTORNEY

April 1, 1958 H. LINDEMANN 2,829,117
PROCESS FOR MAKING CLOSED CELL CELLULAR BODIES
Filed July 27, 1953 5 Sheets-Sheet 2

FIG. 2

INVENTOR
Herbert Lindemann
BY
Michael S. Striker
ATTORNEY

United States Patent Office 2,829,117
Patented Apr. 1, 1958

2,829,117

PROCESS FOR MAKING CLOSED CELL CELLULAR BODIES

Herbert Lindemann, Sins, Switzerland, assignor to Lonza Electric and Chemical Works Ltd., Basel, Switzerland Application July 27, 1953, Serial No. 370,521

Claims priority, application Switzerland July 31, 1952

9 Claims. (Cl. 260—2.5)

The present invention relates to the manufacture of cellular bodies having closed cells containing gas therein.

More particularly the present invention relates to a process and apparatus for making cellular bodies of the above type from elastomers such as natural and artificial rubber and from thermoplastic resins and the like.

In the manufacture of cellular bodies having closed cells, it has been known to utilize expanding or blowing agents which are mixed with the material of which the cellular bodies are made, these expanding agents breaking up in the heated mass by forming gases. In other known processes gases have been introduced externally into the mass of material under a rather high pressure.

The present invention is concerned with the making of cellular bodies by utilizing externally introduced gases, which has the advantage of being economical and which does not leave undesirable residues in the cellular bodies. Generally, the externally introduced gases are not easily uniformly incorporated in the starting material. It has, therefore, been suggested that a very high pressure of gas be utilized, e. g., a pressure between 200 and 700 atmospheres, and that the treatment be extended over a long period, in order to achieve a completely uniform gas distribution. Further, the use of materials which facilitate gas absorption has been suggested, such materials including plasticizers or solvents added to the starting mass of material.

Also, the use of starting materials having large contact surfaces with air passages has been suggested, so that externally introduced gases can be absorbed by the starting material quickly and uniformly. To this end, mixtures of thermoplastic synthetic materials including plasticizers or solvents, or both, have been provided which are of granular, powdery consistency. The latter procedure, while it gives good results in the manufacture of cellular bodies, is subject to particular disadvantages and difficulties, among them being the fact that additional procedures are necessary therein in order to convey these masses in finely divided, granular, powdery condition. Furthermore, in the manufacture of cellular bodies, these gas-containing, finely divided masses which contain air passages must be compressed under a high mechanical pressure, if the cellular body is to have closed cells with uniform structure. The compression of the finely divided gas-containing mass is an important step, since otherwise the finely divided starting material will not form a homogeneous gel when it is gelatinized. Only such homogeneous gels can be formed into uniform cellular bodies.

It is an object, therefore, of the present invention to provide a process and an apparatus for making cellular bodies of the above type which overcome the above-mentioned disadvantages.

It is a further object of the present invention to provide a method and apparatus for making cellular bodies of the above type wherein gas may easily be incorporated uniformly in the starting material.

It is another object of the present invention to provide a method and apparatus for making cellular bodies of the above type wherein the starting material is in a pasty liquid state.

It is still another object of the present invention to provide a method and apparatus for making cellular bodies of the above type wherein the starting material in pasty liquid state is provided with large contact surfaces for improved absorption of gas brought into contact therewith.

Other objects and advantages of the present invention will be apparent from the description thereof in the specification and the appended claims.

With the above objects in view, the present invention mainly consists in a process of preparing closed-cell, gas-containing cellular bodies of natural and artificial elastomers and thermoplastic resins comprising the steps of forming a pasty liquid mass of at least one substance selected from the group consisting of elastomers and thermoplastic resins and if desired at least one plasticiser and or solvent therefor, giving the pasty liquid mass a shape having a surface contact area several times larger than the surface of a sphere of the mass and bringing the pasty liquid mass in the thus obtained shape into surface contact with a gas under pressure so as to uniformly incorporate and distribute the gas in the pasty liquid mass and forming of said gas-containing mass a closed-cell, gas-containing cellular body by known steps. These steps consisting in heating the gas-containing pasty liquid mass while under pressure until the mass is gelatinized, thereby forming a homogeneous, gelatinized, gas-containing mass, and cooling the homogeneous gas-containing mass and subjecting the same to a pressure below the pressure of the gas contained in the gas-containing mass so as to cause expansion thereof, thereby forming a closed-cell, gas-containing cellular body.

The present invention also consists in an apparatus for preparing closed-cell, gas-containing cellular bodies of the above type which comprises in combination, container means for holding a pasty liquid mass of material adapted to form the closed-cell, gas-containing cellular bodies, conduit means opening into the container means for introducing gas under pressure into the container means, distributing means associated with the container means for giving the pasty liquid mass therein a shape having a surface contact area which is several times larger than the surface of a sphere of the mass and for bringing the pasty liquid mass into surface contact with the gas in the container means, so as to uniformly incorporate and distribute the gas in the pasty liquid mass, heating means for gelatinizing the gas-containing pasty liquid mass, and pressure control means associated with the container means and adapted to retain the gas in the container means under pressure and adapted to reduce the pressure thereinbelow the pressure of the gas contained in the gas-containing mass, whereby the gas-containing mas is adapted to expand so as to form a closed-cell, gas-containing cellular body.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

The apparatus shown in the various figures are more fully described in connection with the examples set forth hereinafter.

It has been found, according to the present invention, that a relatively rapid and particularly uniform incorporation of externally introduced gases, which are condensable only at very low temperatures, in thermoplastic materials which are of pasty, liquid consistency can be achieved at a relatively low gas pressure, if the starting material in pasty liquid condition is provided with large contact surfaces and the starting material is brought in such condition into contact with the gas so that there are relatively large contact faces between the faces of the starting material and the gas. In this connection, the term "relatively large contact faces," as used in this case, is intended to refer to a surface contact area of the starting mass which is several times larger than the surfaces of a sphere of said mass. The ratio of the contact surface (that is the surface in contact with the gases to be dissolved) to the area of a homogeneous sphere is depending from the way such contact surfaces are produced and the size of the sphere.

If the contact surface is produced for example, by continuously dipping into a pasty liquid the walls of a moving e. g. rotating container enclosing the empty space above the level of the said pasty liquid, the contact surface is a function of the surface of said walls, the thickness of the layer of said pasty liquid, and the duration of the treatment. In other words this contact surface is equal to the sum of the coatings consecutively renewed as the container is rotating.

If the contact surface is produced by spraying this highly viscous liquid into a dissolving vessel, the surface is of course depending from the particle size of the aerosol. According to the way of producing the absorption surface the latter should be at least 100 times larger than the area of a sphere of the same weight to working substance, whereby the surface produced by a rotating container can be comprised between 100–500 times, and in the case of spraying even 1000–5000 times the surface of said sphere, or more. The speed of absorption of the gases is depending upon the laws of absorption. The invention embodies also all surfaces produced by other surface enlarging devices.

The above-mentioned uniform incorporation of gas in the starting material can be produced by placing the pasty fluid mass in a container, in which gas is introduced under pressure and which is continuously rotated. The rotational motion can be produced by mounting an elongated container, which is filled partly with gas under pressure and partly with the pasty fluid mass, for rotation about its lateral axis. Furthermore, mixing devices, such as stirrers, kneaders, screw conveyers and the like, can be provided in the container in which the gas under pressure and the starting material are contained, it being understood that these mixing devices are so arranged and operated therein that an increase of the contact surfaces between the phases is effected. This effect may be obtained by having such mixing devices operate partly in the gaseous phase and partly in the pasty liquid phase.

Also, the gas incorporation procedure may be carried out by providing spraying means in the upper part of the stationary container through which the starting material can be introduced in the form of droplets, threads, strands or sheets, in which forms the mass has relatively large contact surfaces in proportion to its mass. In such a procedure, the starting mass is collected in the lower part of the container and may be conducted therefrom by conveyor means again to the spraying means, and in this way the process may be repeated as often or as long as is necessary to obtain the desired degree of gas absorption in the pasty liquid mass.

If the starting material is introduced in the form of fine droplets, fluid streams or bands, a furtheer improved gas absorption may be obtained by disposing in the container such devices as packing material, Raschig rings, or plates. The gas containing starting material is collected at the bottom of the container, and it can be transported therefrom to a gelatinizing means or mold means.

It is also possible to carry out the process in reverse fashion, in that instead of placing the pasty liquid mass in motion relative to the gas under pressure, the gas under pressure can be brought into movement relative to the pasty liquid mass. This procedure can be effected by placing the pasty liquid mass in a stationary pressure container and introducing gas under pressure into the container below the level of the contents therein, the gas preferably being introduced in finely divided form through the pasty liquid mass, so as to agitate the mass and increase the contact surface between the phases. In this procedure, the gas under pressure can be released from the upper part of the container through a valve in order to maintain the desired pressure in the vessel, and, if desire, the released gases can be again brought to the gas supply conduit by means of a gas pump.

The inventive concept of producing relatively large contact surfaces between the pasty liquid phase and the gas phase for intensifying the incorporation of gas under pressure into the starting mass can be achieved in different apparatus, which may consist, for example, entirely of a pressure mold in which the gassing, heating or gelatinizing, and finishing steps may be carried out. By "finishing step" it is intended to refer to the making of the crude cellular body in which the gassed and heated or gelatinized mass is cooled and given its form by a mold, is released from pressure therein and the thus treated material is removed from the mold in the form of a crude cellular body.

It is possible to carry out the above process in two or more pressure vessels, as will be seen from the examples set forth herein. Preferably, the starting mass, according to the invention, is treated with the gas in one cotainer and gelatinized in a second and replaceable container, in which the crude cellular body may be treated with the finishing step. It is essential in the conveying of the gas-containing mass from one container into the other container that the pressure is not allowed to drop below the pressure necessary for maintaining the gas in solution in the mass, in order to avoid foaming up of the mass.

In general, starting materials are used which are in a pasty liquid condition in the cold, and these materials are gelatinized after being subjected to a gassing treatment. In the case of starting materials containing or not at least one solvent and/or plasticiser which are of such form that they assume a pasty liquid condition only by being heated, the heating and/or gelatinizing of such materials can be carried out before or during the gassing step.

A particularly noteworthy advantage of the present process consists in the fact that the mass need not be compressed, since the pasty liquid condition in which it already exists constitutes a suitable condensed condition. In the treatment of finely divided, e. g., powdery, masses used in previously known processes, it is absolutely necessary to compress these materials. In fact, the greater the amounts of material used, the greater is the pressure necessary for compression of the materials, and it is therefore necessary to utilize suitable high-pressure apparatus in such processes.

Thermoplastic materials which may be used in the present invention are such materials as polymers, as, for example, polyvinyl chloride or mixed polymerisates, as, for example, those which contain 80–95% vinyl chloride and 20–5% vinyl acetate, as well as mixed polymerisates of vinyl chloride and acrylonitrile, or of vinyl chloride, vinyl acetate and acrylonitrile, also vinyl chloride and acrylic esters, to which may be added necessary solvents and/or plasticizers. There may also be used other thermoplastics, as, for example, polystyrol, polyacrylic compounds, and cellulose acetates. Further, elastomers may be used, as, for example, natural and artificial rubbers, as well as mixtures of the same with the above mentioned materials, as, for example, such mixtures as polyvinyl chloride and acrylonitrile-butadiene-polymerisates.

Gases which are condensable only at very low temperatures and which are suitable for use in the present invention include gases of low diffusion as, for example, nitrogen. It is also possible to use easily diffusable gases such as $H_2$ and $CO_2$, or mixtures of the latter gases with nitrogen.

The gas pressures which are used in known autoclave devices and which are of the order of between 200 and 700 atmospheres can be substantially reduced below the latter limits in the process according to the present invention, and, in fact, depending on the degree of gas content with which the thermoplastic mass is to be provided, the pressure can be reduced, for example, to 30 atmospheres. In general, gas pressures above 300 atmospheres are not used in the present process. Of course, the optimum amount of gas pressure which is used is also dependent on the frequency with which the contact surfaces between the phases are varied and upon the degree of dispersion in which the pasty liquid mass comes into contact with the gas. There are other relationships, of course, between the gas pressure, the rapidity of incorporation of the gas and the degree of division of the pasty liquid mass, and the optimum conditions for effecting the desired gas content in the pasty liquid mass within a particular time with a particular gas pressure can be determined by the expert in the art by simple experimentation.

As mentioned above, in carrying out the present process in more than one container, it is necessary to transfer the gas-containing mass from one container to the other without allowing the mass to foam up. The transfer of the mass can be effected by mechanical conveying devices or by means of gas pressure. Examples of suitable transfer devices are hydraulic pumps, booster pumps, or screw conveying devices.

In the process, it is important that the gas-containing and possibly heated mass should not lose its gas content in being transferred from container to container. The loss of the gas content can be avoided by the use of counter pressure provided by gaseous or liquid media or by means of a mechanical counter pressure as for example a mold piston, which are provided in the containers in the end stage of the process. If such counter pressure is not provided, the mass which contains gas under pressure will foam up, and there will result a cellular body which yields more or less spongy cells which are open.

The transfer of the gas-containing material to the mold container can be carried out through narrow passages and without the danger of foaming up of the material by temporarily placing the mass under a pressure which is higher than that used for the incorporation of the gas therein before it is transferred into the container at the end stage of the process. A pressure corresponding to this pressure must also be provided in the end stage container, as, for example, by introducing in the latter container a gas or inert fluid media, or the mold piston can be completely inserted into the mold, and then the pressure in the container in the first stage of the process can be raised with respect to the pressure in the container in the end stage.

The following examples are given as illustrative of preferred processes according to the present invention, and the apparatus described therein and shown in the drawings are given as examples of embodiments of devices in which the present process may be carried out. It is to be understood that these examples are set forth for illustrative purposes only and are in no way intended to limit the scope of the present invention.

*Example I*

Figure 1:
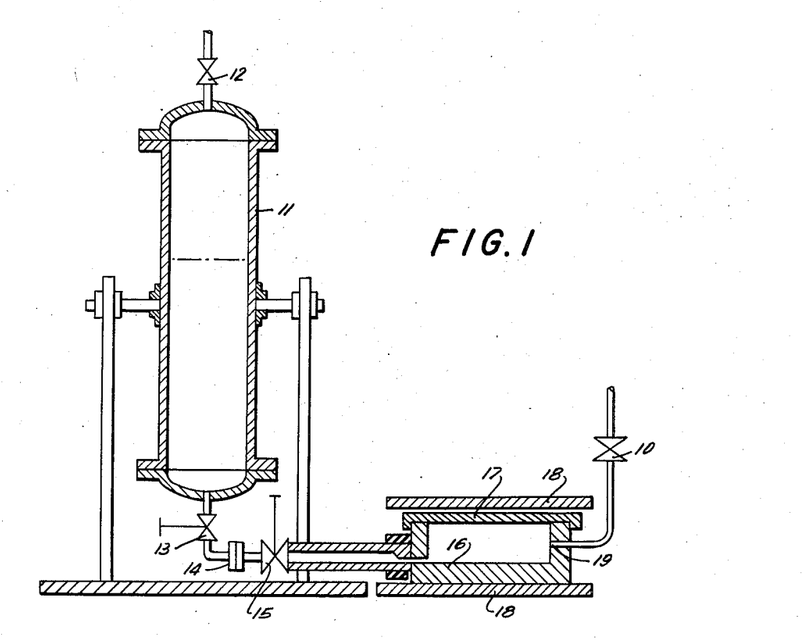
Fig. 1 is a schematic illustration of apparatus for carrying out the process described in Example 1 below.

A paste of 50 parts by weight of stabilized polyvinyl chloride, 20 parts of dioctyl phthalate and 30 parts of dibutyl phthalate is placed in a pressure vessel 11, as shown schematically in Fig. 1. The pressure vessel is filled half full with the paste, and the air space is filled with nitrogen under a pressure of 200 atmospheres through the gas inlet valve 12. Vessel 11 is slowly rotated and, depending upon the volume and the amount of its content, is allowed to rotate during a period of five to six hours. During the rotation, the outlet valve 13 is closed and the separable flange 14 is separated. The effect of the rotation is such that the mass in the container flows along the walls of the vessel and constantly changes its contact surfaces and in this condition comes into contact with and incorporates the gas under pressure. Vessel 11 is then stopped from rotating, and the gas pressure in the air space of the container is raised by introduction of gas through gas inlet valve 12 to 300 kg./cm.$^2$. The replaceable mold container 16 shown in Fig. 1 has a cover 17 and a valve 15 and is connected to flange 14. Mold 16 and cover 17 are held together by the plates of a hydraulic press 18 which can be heated electrically or with steam. Mold 16 is filled through valve 10 with nitrogen under 230 atmospheres pressure, and communication between vessel 11 and mold 16 is established by opening valves 13 and 15. Then, by opening valve 10, the nitrogen gas is allowed to slowly escape from the mold, so that the gas-saturated paste flows out of pressure vessel 11 into mold 16. Mold 16 is then filled up to the height of the gas-escape opening 19. As soon as the gas-containing material reaches valve 10, the valve is closed. The escape of the counter pressure gas is so controlled that the pressure does not go substantially below the beginning pressure of 230 atmospheres.

It is important that, in allowing the counter pressure gas to escape, the pressure in mold 16 does not go below the pressure of the gas which is incorporated in the mass. The gas-containing material occupies the vessel, without foaming up, to the desired height and is further prevented from foaming up by the static counter gas pressure provided over it. By means of heating plates 18 the gas-containing mass in mold 16 is gelatinized. At the end of the gelatinizing process and before cooling of the mass, in order to obtain a uniform cell formation, the pressure of the static gas cushion on the mass is reduced to such an extent that the mass expands in the mold to a volume one-third greater than its original volume. The mass is then cooled, and the cover is raised from the mold. The finished crude cellular body is taken out, and is expanded in further treatment by heating. There is obtained by this process a cellular body having a specific gravity of about 0.08 to 0.1.

*Example II*

Figure 2:
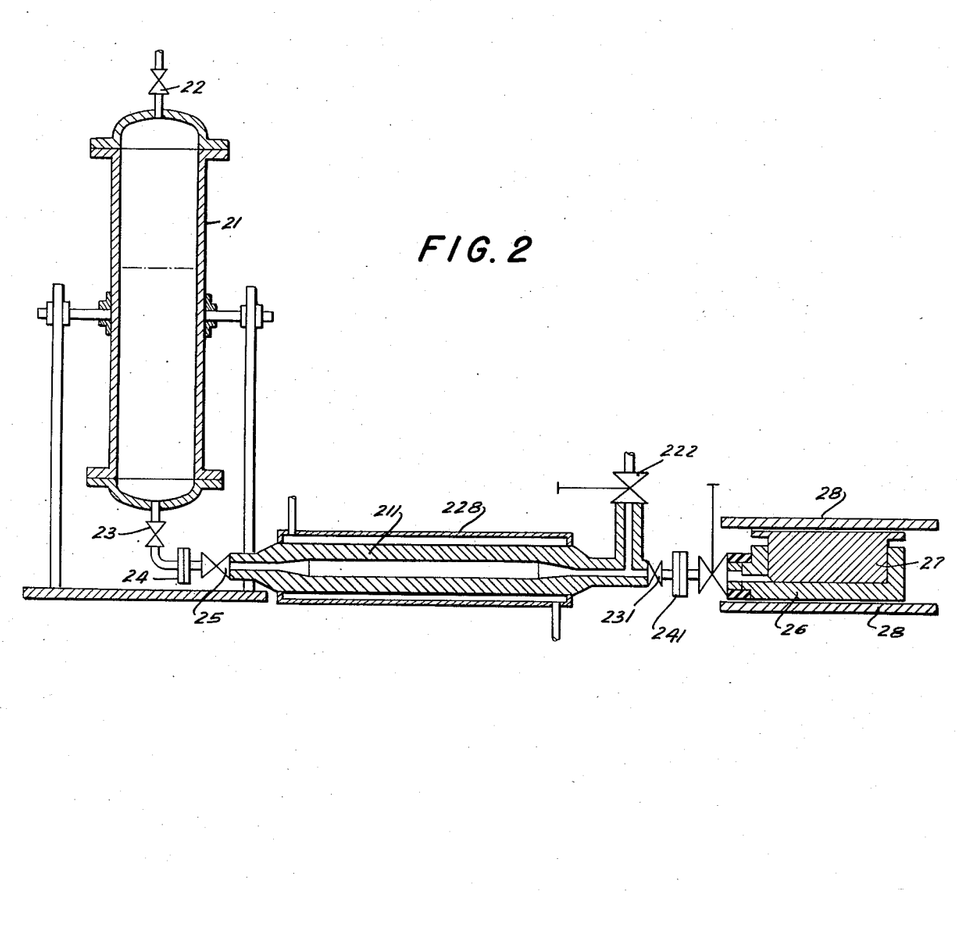
Fig. 2 shows apparatus for carrying out the Example 2 process.

The apparatus used in this example is schematically shown in Fig. 2. In pressure vessel 21, which is similar to vessel 11 shown in Fig. 1, a paste formed of polyvinyl chloride and a plasticizer is brought into contact with gas under pressure introduced into the container through valve 22. After the desired amount of gas has been absorbed into the mass, the mass is transferred to gelatinizing container 211 through valve 23 and valve 25. Gelatinizing container 211 is provided with a heating sleeve 228. Before the transfer of the gasified mass, gelatinizing container 211, as well as all its passages, is filled through valve 222 with nitrogen gas under a pressure of 250 kg./cm.² Mold 26 having a piston 27 is connected by means of flanges 241 to gelatinizing container 211 and is arranged in a hydraulic press. By opening valves 231 and 251, the gelatinized, gasified mass is transferred from the gelatinizing container 211 to mold 26. By reducing the pressure of the hydraulic press, which includes heating or cooling plates 28, mold 26 is filled with the gelatinized gas-containing mass. The process of filling the mold can be repeated several times. It is necessary only that valves 231 and 251 be closed before separating flanges 241, than the filled mould can be changed with another empty mould.

Example III

Figures 3, 7:
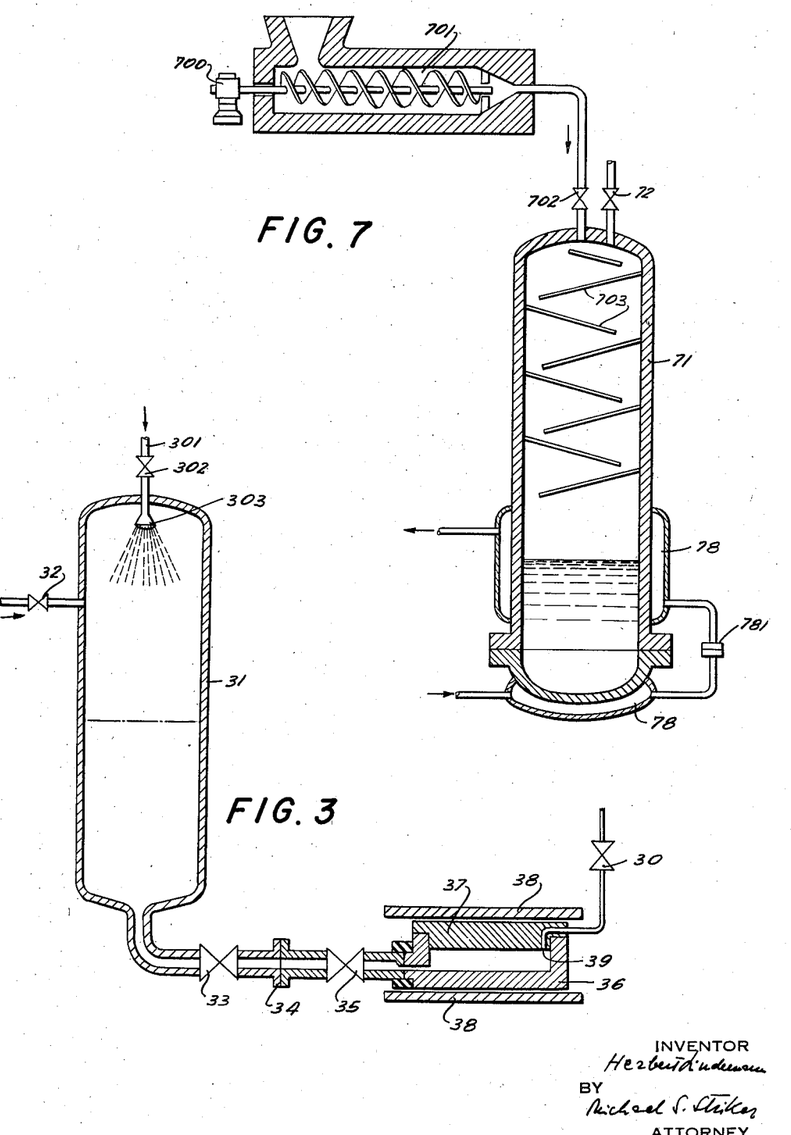
Fig. 3 shows apparatus for carrying out the Example 3 process.
Fig. 7 shows apparatus for carrying out the Example 7 process.

The apparatus shown in Fig. 3 is used to carry out the process of this example, and in this process the same materials are used as in Examples I and II. The gas is introduced into pressure vessel 31 at a pressure of 200 atmospheres and the material is sprayed into the container. The material is conveyed through conduit 301, valve 302, and out of spray nozzle 303 located in the interior of the pressure vessel. The gas is introduced through valve 32. The transfer of the material can be carried out by conveying devices, which are not illustrated, such as, for example, a pump. The material may be introduced into the container so that it falls in the form of droplets, thin filaments, or bands into the gaseous atmosphere. The material in such form absorbs the gas in its passage through the gaseous atmosphere and collects in the bottom of the pressure vessel. From here the material can be transferred, in the manner described in Example I, to mold 36 equipped with cover 37 and filled with nitrogen gas under 220 atmospheres pressure. By opening valve 30, the counter pressure gas is allowed to escape slowly out of the mold, so that the gas-containing paste flows out of pressure vessel 31 through valves 33 and 35 into mold 36. The escape of the counter pressure gas is so controlled that the pressure thereof does not fall below the pressure of the gas contained in the mass, so that the mass does not foam up. Heating of the mass is provided by the two heating plates 38 of a hydraulic press, which is not shown. An increase in the volume of the mass can be obtained after it is gelatinized by a piston device inserted through cover 37. Cooling and expansion of the mass can be provided as described in Example I.

Example IV

Figure 4:
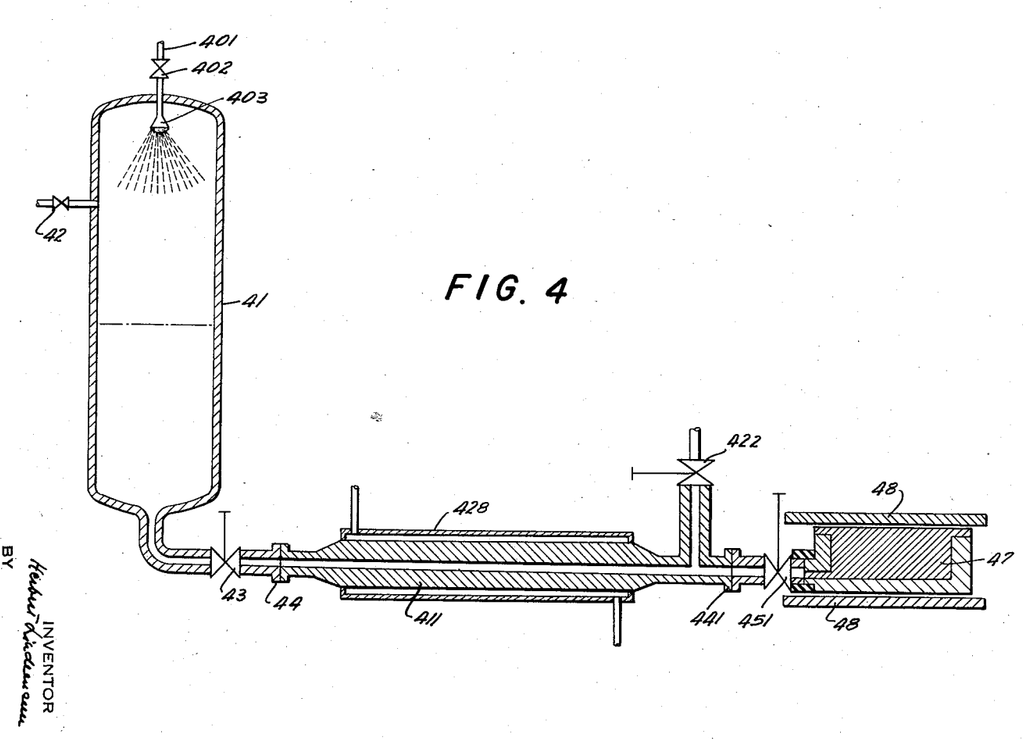
Fig. 4 shows apparatus for carrying out the Example 4 process.

The process carried out in accordance with this example can be done in the apparatus shown in Fig. 4. The same starting mixture as described in Example III can be used, and this material can be brought into contact with gas under pressure in pressure vessel 41 as described in Example III and shown in Fig. 3. The gas-containing material is transferred through a heating and gelatinizing apparatus 411 having a heating sleeve 428, in the manner described in Example II. In starting the operation of the apparatus, a counter pressure gas is introduced through valve 422 into gelatinizing vessel 411 and into the passages associated therewith. Then valve 43 is opened. Filling of mold 46 equipped with piston cover 47 follows as described in Example II. Gelatinizing vessel 411 is equipped with flange connections 44 and 441, one flange connection being on the side nearest the pressure vessel and the other on the side nearest the mold. In this apparatus, as well as in the previously described devices, continuous filling of different exchangeable molds can be carried out. The heating plates or cooling plates 48 are arranged adjacent mold 46 as in the above described devices, and parts 401, 402 and 403 correspond to parts 301, 302 and 303 of Fig. 3.

Example V

Figure 5:
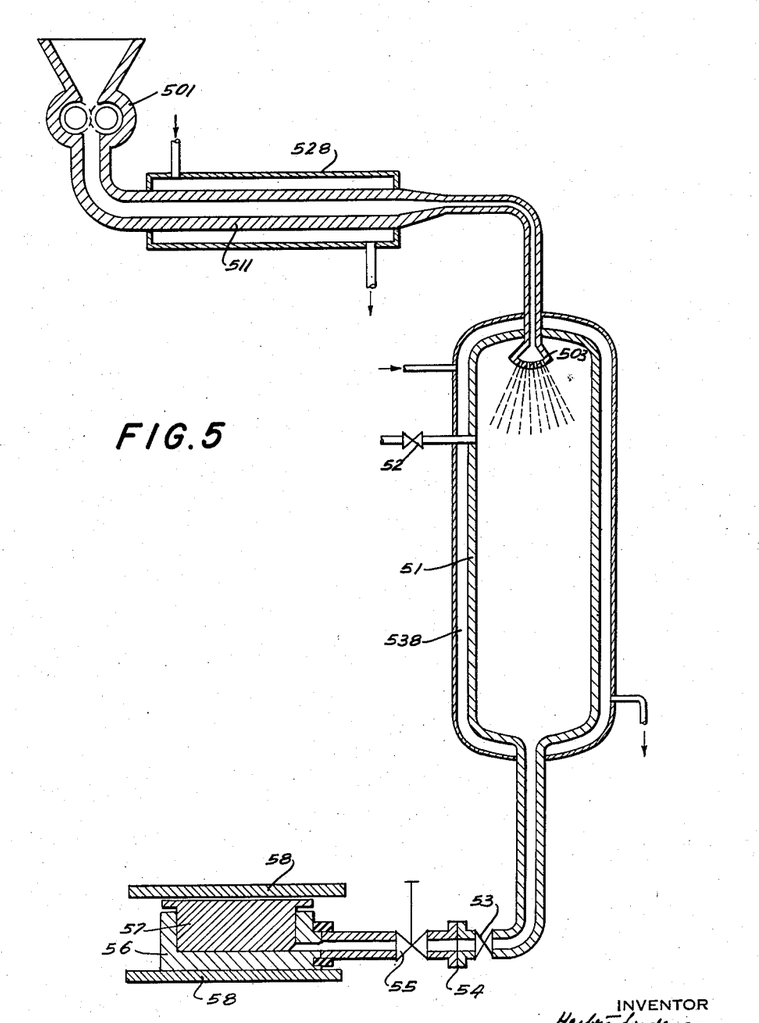
Fig. 5 shows apparatus for carrying out the Example 5 process.

A mixture of 50 parts by weight of stabilized polyvinyl chloride and 40 parts of dibutyl phthalate are fed into the apparatus of Fig. 5 with the aid of gear pump 501, and from the latter pump the mass is brought into gelatinizing vessel 511 equipped with heating sleeve 528. From here, the material is introduced into container 51 equipped with heating jacket 538 through the spraying device 503. Nitrogen gas under 150 atmospheres pressure is brought into container 51 through valve 52. After the material is sprayed out of spray device 503, it has the form of droplets or thin filaments, and in this form it absorbs the nitrogen in the pressure gas atmosphere and collects in the lower part of pressure vessel 51. From here the material proceeds, as described and shown in Example III and Fig. 3, through valve 53, flange connection 54 and valve 55 into mold 56 equipped with piston cover 57. Heating or cooling plates 58 form parts of a hydraulic press, as described in the above examples.

Example VI

Figure 6:
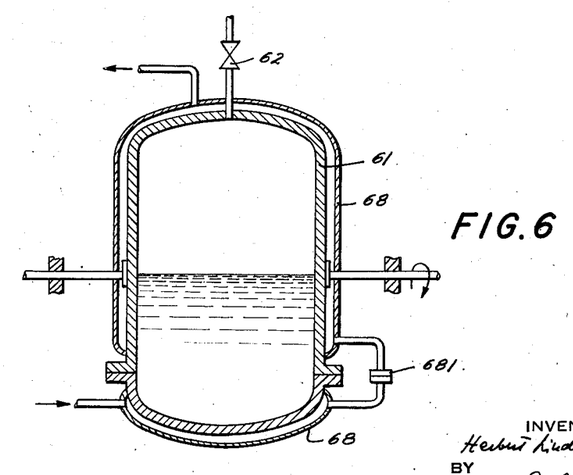
Fig. 6 shows apparatus for carrying out the Example 6 process.

Pressure vessel 61, shown in Fig. 6, is half filled with a paste formed of 55 parts per weight of mixed polymerisates of 80% vinyl chloride and 20% vinyl acetate, and 45 parts of dioctyl phthalate. The pressure vessel is rotatable about a lateral axis and is formed of two parts. Both parts of the pressure vessel are joined together by means of flange connections. The parts of the pressure vessel are surrounded with a heating jacket 68. The connection between the parts of the heating jacket is formed through a flange connection 681. The free space in the pressure vessel over the paste is filled through valve 62 with a pressure gas under 220 atmospheres pressure. The gas consists of a gas mixture of $N_2$ of 60% by volume and $H_2$ of 40% by volume. The container is slowly rotated about its lateral axis at room temperature for about four hours. During this period the paste slowly flows along the walls of the container so that its contact surfaces are enlarged and are constantly changing, with the result that the entire mass is in intimate and thorough contact with the gas. The rotation of the container is now halted, and hot vapor or hot water is circulated through heating jacket 68. The heating continues for about three hours at about 175° C. During the heating process the free space over the paste in the vessel is held under the starting gas pressure of 220 atmospheres. At the end of the gelatinizing process and before cooling of the mass, the gas pressure over the mass is reduced to such an extent that the mass expands to about 30% over its original volume. The cooling of the gas-containing mass then follows. The gas pressure is removed and the finished crude cellular body is taken out of the container, and finally is expanded by reheating.

Example VII

An easily soluble styrol polymerisate is mixed with sufficient benzene to make by heating a liquid paste. The mixture is treated in the apparatus illustrated in Fig. 7. The mixture is introduced into vessel 71 through valve 702 with the aid of a screw conveyer device 701 which is driven by the driving device 700. The mixture coming from the screw is heated in the passage tube and in the container 71 with a treating sleeve not shown in this Fig. 7. Hydrogen is introduced into container 71 through valve 72 at a pressure of 100 atmospheres. The pasty liquid mass flowing into container 71 passes over plates 703 arranged in the container, which produces relatively large contact surface areas in the flowing mass, so that the mass incorporates $H_2$ gas as it flows downwardly through the container. The mass containing the gas collects at the bottom of the container, occupying about one-third of the height of the container. During the filling of the container with the material, the gas pressure is maintained at 100 atmospheres. During the filling and treating the mass is heated to about 100° C. As soon as the container is filled to the desired amount the mass is cooled. Container 71 is formed of two parts, similarly to container 61 shown in Fig. 6, and heating jacket 78 is formed of two parts which are connected by flange connections 781. In contrast to the rotatable container 61 container 71 is stationary.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A process of producing closed-cell, gas-containing cellular bodies, comprising the steps of agitating a pasty liquid mass of a thermoplastic material selected from the group consisting of polyvinyl chloride, co-polymers of vinyl chloride and vinyl acetate, co-polymers of vinyl chloride and acrylonitrile, co-polymers of vinyl chloride, vinyl acetate and acrylonitrile, polystyrol, cellulose acetate, and mixtures of polyvinyl chloride and acrylonitrile-butadiene polymerizates in contact with a gas absorbable under a pressure sufficient to force said gas into said pasty liquid mass in a first container so as to give said pasty liquid mass a surface contact area many times larger than the surface of a sphere of said mass and thus uniformly incorporate said gas under pressure in said pasty liquid mass; transferring the thus formed gas-containing pasty liquid mass to a second container while maintaining said pressure on said mass so as to prevent foaming up of said mass and loss of gas therefrom; heating said gas-containing pasty liquid mass in said second container while still under pressure until gelatinization thereof, thereby forming a homogeneous, gelatinized gas-containing mass; and cooling and expanding said gelatinized gas-containing mass, thereby forming a closed-cell, gas-containing cellular body.

2. A process of producing closed-cell, gas-containing cellular bodies, comprising the steps of agitating a pasty liquid mass of a thermoplastic material selected from the group consisting of polyvinyl chloride, co-polymers of vinyl chloride and vinyl acetate, co-polymers of vinyl chloride and acrylonitrile, co-polymers of vinyl chloride, vinyl acetate and acrylonitrile, polystyrol, cellulose acetate, and mixtures of polyvinyl chloride and acrylonitrile-butadiene polymerizates in contact with a gas absorbable under pressure of about 30–350 atmospheres in a first container so as to give said pasty liquid mass a surface contact area many times larger than the surface of a sphere of said mass and thus uniformly incorporate said gas under pressure in said pasty liquid mass; transferring the thus formed gas-containing pasty liquid mass to a second container while maintaining said pressure on said mass so as to prevent foaming up of said mass and loss of gas therefrom; heating said gas-containing pasty liquid mass in said second container while still under said pressure until gelatinization thereof, thereby forming a homogeneous, gelatinized gas-containing mass; and cooling and expanding said gelatinized gas-containing mass, thereby forming a closed-cell, gas-containing cellular body.

3. A process of producing closed-cell, gas-containing cellular bodies, comprising the steps of agitating a pasty liquid mass of a thermoplastic material selected from the group consisting of polyvinyl chloride, co-polymers of vinyl chloride and vinyl acetate, co-polymers of vinyl chloride and acrylonitrile, co-polymers of vinyl chloride, vinyl acetate and acrylonitrile, polystyrol, celluose acetate, and mixtures of polyvinyl chloride and acrylonitrile-butadiene polymerizates in contact with a gas absorbable under a pressure sufficient to force said gas into said pasty liquid mass in a first container so as to give said pasty liquid mass a surface contact area many times larger than the surface of a sphere of said mass and thus uniformly incorporate said gas under pressure in said pasty liquid mass, thereby forming a pasty liquid mass of said substance having said gas under pressure uniformly distributed therein; transferring the thus formed gas-containing pasty liquid mass to a second container while maintaining said pressure on said mass so as to prevent foaming up of said mass and loss of gas therefrom; heating said gas-containing pasty liquid mass in said second container while still under pressure until gelatinization thereof, thereby forming a homogeneous, gelatinized gas-containing mass; transferring said gelatinized gas-containing mass to a third container without reducing the pressure on said mass so as to prevent loss of gas therefrom; and cooling and expanding said gelatinized gas-containing mass, thereby forming a closed-cell, gas-containing cellular body.

4. A process of producing closed-cell, gas-containing cellular bodies, comprising the steps of rotating a first container containing a pasty liquid mass of a thermoplastic material selected from the group consisting of polyvinyl chloride, co-polymers of vinyl chloride and vinyl acetate, co-polymers of vinyl chloride and acrylonitrile, co-polymers of vinyl chloride, vinyl acetate and acrylonitrile, polystyrol, cellulose acetate, and mixtures of polyvinyl chloride and acrylonitrile-butadiene polymerizates and having a volume smaller than the volume of said first container, said first container also containing gas absorbable under a pressure sufficient to force said gas into said pasty liquid mass, so as to constanly change the contact surface of said pasty liquid mass and thus give said pasty liquid mass a surface contact area many times larger than the surface of a sphere of said mass, thereby uniformly incorporating said gas under pressure in said pasty liquid mass; transferring the thus formed gas-containing pasty liquid mass to a second container while maintaining said pressure on said mass so as to prevent foaming up of said mass and loss of gas therefrom; heating said gas-containing pasty liquid mass in said second container while still under said pressure until gelatinization thereof, thereby forming a homogeneous, gelatinized gas-containing mass; and cooling and expanding said gelatinized gas-containing mass, thereby forming a closed-cell, gas-containing cellular body.

5. A process of producing closed-cell, gas-containing cellular bodies, comprising the steps of passing droplets of a pasty liquid mass of a thermoplastic material in a first container through a gas absorbable under a pressure sufficient to force said gas into said pasty liquid mass so as to give said pasty liquid mass a surface contact area many times larger than the surface of a sphere of said mass and thus uniformly incorporate said gas under pressure in said pasty liquid mass, said thermoplastic material being selected from the group consisting of polyvinyl chloride, co-polymers of vinyl chloride and vinyl acetate, co-polymers of vinyl chloride and acrylonitrile, co-polymers of vinyl chloride, vinyl acetate and acrylonitrile, polystyrol, cellulose acetate, and mixtures of polyvinyl chloride and acrylonitrile-butadiene polymerizates; transferring the thus formed gas-containing pasty liquid mass to a second container while maintaining said pressure on said mass so as to prevent foaming up of said mass and loss of gas therefrom; heating said gas-containing pasty liquid mass in said second container while still under said pressure until gelatinization thereof, thereby forming a homogeneous, gelatinized gas-containing mass; and cooling and expanding said gelatinized gas-containing mass, thereby forming a closed-cell, gas-containing cellular body.

6. A process of producing closed-cell, gas-containing cellular bodies, comprising the steps of passing bubbles of a gas absorbable under pressure through a pasty liquid mass of a thermoplastic material in a first container, said pressure being sufficient to force said gas into said pasty liquid mass so as to give said pasty liquid mass a surface contact area in contact with said gas under pressure many times larger than the surface of a sphere of said mass and thus uniformly incorporate said gas under pressure in said pasty liquid mass, said thermoplastic material being selected from the group consisting of polyvinyl chloride, co-polymers of vinyl chloride and vinyl acetate, co-polymers of vinyl chloride and acrylonitrile, co-polymers of vinyl chloride, vinyl acetate and acrylonitrile, polystyrol, cellulose acetate, and mixtures of polyvinyl chloride and acrylonitrile-butadiene polymerizates; transferring the thus formed gas-containing pasty liquid mass to a second container while maintaining said pressure on said mass so as to prevent foaming up of said mass and loss of gas therefrom; heating said gas-containing pasty liquid mass in said second container while still under said pressure until gelatinization thereof, thereby forming a homogeneous, gelatinized gas-containing mass; and cooling and expanding said gelatinized gas-containing mass, thereby forming a closed-cell, gas containing cellular body.

7. A process of producing closed-cell, gas-containing cellular bodies, comprising the steps of agitating a pasty liquid mass of a thermoplastic material selected from the group consisting of polyvinyl chloride, co-polymers of vinyl chloride and vinyl acetate, co-polymers of vinyl chloride and acrylonitrile, co-polymers of vinyl chloride, vinyl acetate and acrylonitrile, polystyrol, cellulose acetate, and mixtures of polyvinyl chloride and acrylonitrile-butadiene polymerizates in contact with a gas absorbable under a pressure sufficient to force said gas into said pasty liquid mass in a first container so as to give said pasty liquid mass a surface contact area many times larger than the surface of a sphere of said mass and thus uniformly incorporate said gas under pressure in said pasty liquid mass, thereby forming a pasty liquid mass of said substance having said gas under pressure uniformly distributed therein; transferring the thus formed gas-containing pasty liquid mass to a second container while maintaining said pressure on said mass, said pressure on said mass being maintained by gas pressure so as to prevent foaming up of said mass and loss of gas therefrom; heating said gas-containing pasty liquid mass in said second container while still under said gas pressure until gelatinization thereof, thereby forming a homogeneous, gelatinized gas-containing mass; and cooling and expanding said gelatinized gas-containing mass, thereby forming a closed-cell, gas-containing cellular body.

8. A process of producing closed-cell, gas-containing cellular bodies, comprising the steps of agitating a pasty liquid mass of a thermoplastic material selected from the group consisting of polyvinyl chloride, co-polymers of vinyl chloride and vinyl acetate, co-polymers of vinyl chloride and acrylonitrile, co-polymers of vinyl chloride, vinyl acetate and acrylonitrile, polystyrol, cellulose acetate, and mixtures of polyvinyl chloride and acrylonitrile-butadiene polymerizates in contact with a gas absorbable under a pressure sufficient to force said gas into said pasty liquid mass in a first container so as to give said pasty liquid mass a surface contact area many times larger than the surface of a sphere of said mass and thus uniformly incorporated said gas under pressure in said pasty liquid mass, thereby forming a pasty liquid mass of said substance having said gas under pressure uniformly distributed therein; transferring the thus formed gas-containing pasty liquid mass to a second container while maintaining said pressure on said mass, said pressure on said mass being maintained by liquid pressure so as to prevent foaming up of said mass and loss of gas therefrom; heating said gas-containing pasty liquid mass in said second container while still under said liquid pressure until gelatinization thereof, thereby forming a homogeneous, gelatinized gas-containing mass; and cooling and expanding said gelatinized gas-containing mass, thereby forming a closed-cell, gas-containing cellular body.

9. A process of producing closed-cell, gas-containing cellular bodies, comprising the steps of agitating a pasty liquid mass of a thermoplastic material selected from the group consisting of polyvinyl chloride, co-polymers of vinyl chloride and vinyl acetate, co-polymers of vinyl chloride and acrylonitrile, co-polymers of vinyl chloride, vinyl acetate and acrylonitrile, polystyrol, cellulose acetate, and mixtures of polyvinyl chloride and acrylonitrile-butadiene polymerizates in contact with a gas absorbable under a pressure sufficient to force said gas into said pasty liquid mass in a first container so as to give said pasty liquid mass a surface contact area many times larger than the surface of a sphere of said mass and thus uniformly incorporate said gas under pressure in said pasty liquid mass, thereby forming a pasty liquid mass of said substance having said gas under pressure uniformly distributed therein; transferring the thus formed gas-containing pasty liquid mass to a second container while maintaining said pressure on said mass, said pressure on said mass being maintained by mechanical pressure so as to prevent foaming up of said mass and loss of gas therefrom; heating said gas-containing pasty liquid mass in said second container while still under said mechanical pressure until gelatinization thereof, thereby forming a homogeneous, gelatinized gas-containing mass; and cooling and expanding said gelatinized gas-containing mass, thereby forming a closed-cell, gas-containing cellular body.

References Cited in the file of this patent
UNITED STATES PATENTS

| | | |
|---|---|---|
| 2,105,511 | Snow et al. | Jan. 18, 1938 |
| 2,291,213 | Cuthbertson | July 28, 1942 |
| 2,299,593 | Roberts et al. | Oct. 20, 1942 |
| 2,447,056 | Cooper | Aug. 17, 1948 |
| 2,450,436 | McIntire | Oct. 5, 1948 |
| 2,666,036 | Schwenke | Jan. 12, 1954 |